R. C. COX AND J. F. McGINNITEY.
MASHING AND MIXING MACHINE.
APPLICATION FILED MAR. 9, 1917. RENEWED FEB. 26, 1920.

1,351,890. Patented Sept. 7, 1920.

Inventors
Ross C. Cox and J. F. McGinnitey,

By Talbert & Parker
Attorneys

UNITED STATES PATENT OFFICE.

ROSS C. COX AND JOHN F. McGINNITEY, OF ST. JOSEPH, MISSOURI.

MASHING AND MIXING MACHINE.

1,351,890.   Specification of Letters Patent.   Patented Sept. 7, 1920.

Application filed March 9, 1917, Serial No. 153,689. Renewed February 26, 1920. Serial No. 361,412.

*To all whom it may concern:*

Be it known that we, Ross C. Cox and John F. McGinnitey, citizens of the United States, residing at St. Joseph, in the county of Buchanan and State of Missouri, have invented certain useful Improvements in Mashing and Mixing Machines. of which the following is a specification, reference being had therein to the accompanying drawing.

The invention relates to a mashing and mixing machine, and more particularly to the class of foodstuff mashers or mixers.

The primary object of the invention is the provision of a machine of this character wherein potatoes, turnips, squash, carrots and other foodstuffs can be thoroughly mashed and mixed or the machine may be used for beating eggs, whipping cream or making butter, as well as for mixing dressings or sauces.

Another object of the invention is the provision of a machine of this character wherein the beaters or mixing elements are operated in opposition to each other and can be driven at the desired speed for the proper mixing or mashing of materials with despatch and the mashing and beating of such materials is effected in a sanitary way so as to avoid lumps and will render the material fluffy as the same will be thoroughly whipped for assuring lightness.

A further object of the invention is the provision of a machine of this character wherein the materials can be maintained hot and on operating the machine such materials mashed or thoroughly mixed without possibility of rendering such materials soggy and lumpy.

A still further object of the invention is the provision of a machine of this character wherein the parts are readily accessible so that the machine can be thoroughly cleaned to assure it being sanitary.

A still further object of the invention is the provision of a machine of this character which is simple in construction, thoroughly reliable and efficient in operation, strong, durable and inexpensive in manufacture.

Other objects will be in part obvious and in part hereinafter set forth.

The invention accordingly consists in the features of construction, combination of elements and arrangement of parts which will be exemplified in the construction hereinafter described, and the scope of the application of which will be indicated in the appended claim.

In the accompanying drawing.

Similar reference characters indicate corresponding parts throughout the several views of the drawing.

Figure 1:
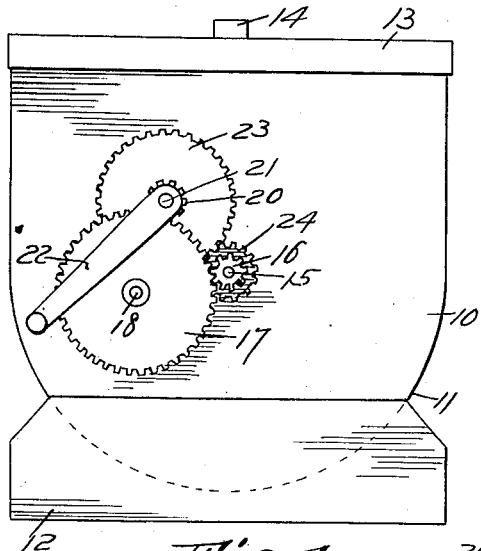
Figure 1 is an end elevation of a machine constructed in accordance with the invention.
Figure 2:
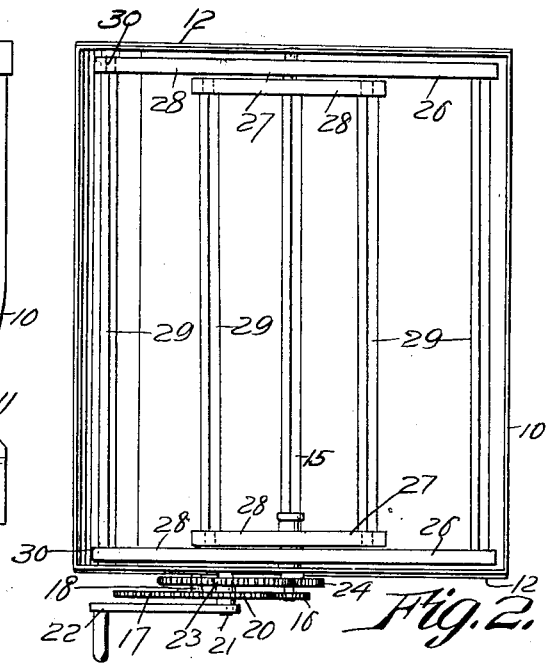
Fig. 2 is a top plan view, with its lid or cover removed.
Figure 3:
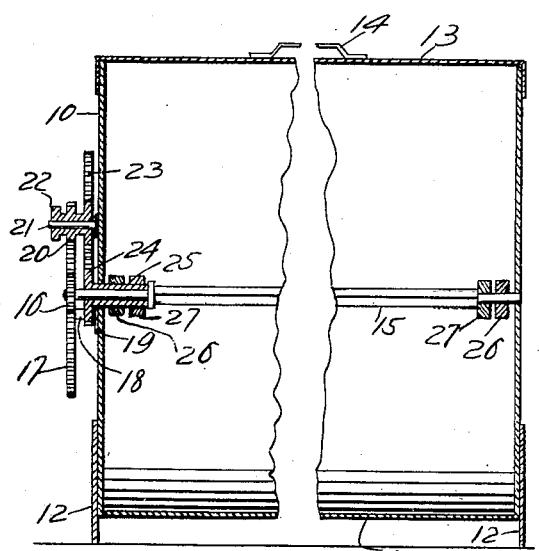
Fig. 3 is a vertical longitudinal sectional view.
Figure 4:
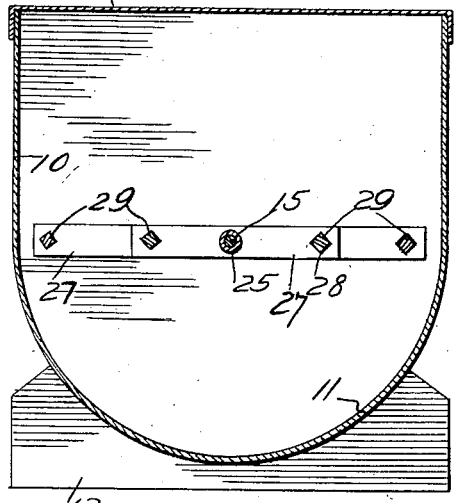
Fig. 4 is a vertical transverse sectional view.

Referring to the drawing in detail, the machine comprises a body 10 forming a container preferably made from metal, although the same may be made from any other suitable material, and is formed with a rounded bottom 11, the body being supported upon rest pieces 12 so that the same can be placed upon a stove or upon a table or other support. Removably fitted on the body 10 at its open top is a lid or cover 13 provided with a loop handle 14 so that it can be conveniently removed from the body or placed thereon by the user of the machine.

Journaled in opposite ends of the body 10, centrally thereof, is a longitudinal shaft 15 which has one end extended externally of the body, and this extended end has fixed thereto a pinion 16 with which meshes a driven gear 17 journaled upon a stud 18 mounted on a bracket 19 fixed to one end of the body 10 exteriorly thereof, and this gear meshes with a pinion 20 journaled upon a stud 21 which is fixed to the end of the body 10 spaced from the stud 18, and this pinion 20 has connected thereto an operating handle 22 so that on turning the pinion 20 motion will be imparted through the gear 21 to the pinion 16 for rotating the shaft 15 in one direction.

The pinion 20 has formed therewith a gear 23 which meshes with a pinion 24 on the outer end of a sleeve 25 which surrounds the shaft 15 and extends interiorly of the body 10, while fixed to said shaft 15 and the sleeve 25 are rotating beater frames 26 and 27, respectively, the gear 23 operating upon the pinion 24 being designed to rotate the beater frame 27 in a reverse direction with respect to the rotation of the beater frame 26, as will be clearly obvious. These frames 26 and 27 are simultaneously rotated through the gear and pinion connections upon actuating the handle 22.

Each beater frame comprises end bars 28 and longitudinal rails 29, the latter being square in cross section throughout a major portion of their length, while the ends are reduced and rounded at 30 to fit within the end bars 28 and are secured thereto so as to form the rigid beating frame. The shaft 15 on that portion which is comprehended between the ends of the frame 27 is also square in cross section. The frame 27 is of considerably less width than the frame 26 and rotates within the latter in a direction opposite to the direction of rotation of said frame 27, and on the placing of materials within the body 10 the beater frames will act thereon for thoroughly mixing the material for the mashing, beating and mixing of the same in a single operation of the machine.

The shaft 15, being square in cross section and rotating with the frame 26 with which it is connected, serves to prevent the accumulation at the center of the container of a substance being mashed and mixed, for the square portion of the shaft, when rotating, deflects such substance from the center of the container toward the rails 29, since first the flat sides and then the edges of the shaft are brought into contact with the substance, thus resulting in an agitation thereof that would not be present if the shaft were round. Further, the rotation of the shaft in one direction and the rotation of the frame 27 in the opposite direction result at one time in bringing the flat sides of the shaft opposite the corners of the rails 29 of the frame 27 and at another time in bringing the corners of the shaft opposite the corners of the said rails. This operation results in a variation of the width of space between the shaft and the rails of the frame 27 at different positions during their relative movement. Therefore lumpy portions of the substance or material being mashed, finding their way between the shaft and the rails of the frame 27, are crushed between the rails and the corners of the shaft.

It is of course to be understood that the arrangement of the gears and pinions for the driving of the beater frames can be changed and rearranged as the occasion may require.

In the use of the machine, potatoes, turnips and other kinds of foodstuffs that require thorough mashing and mixing can be placed within the body 10 and on operating the beater frames the same will effect the thorough mashing or mixing of such foodstuffs so as to render the same thoroughly whipped and fluffy without the presence of lumps, and in the whipping of the foodstuff air is whipped into the same, thus increasing the bulk so as to render it light.

The machine is readily portable so that it can be placed upon a stove for the heating of its contents or it can be positioned upon a table or other support for convenience in serving the contents, the machine being also adaptable for beating eggs, whipping cream and making butter or mixing dressings for croquettes, marmalades or the like, as well as mixing sauces.

From the foregoing description, taken in connection with the accompanying drawing, the construction and operation of the herein described mashing and mixing machine will be readily apparent and, therefore, a more extended explanation has been omitted.

Having thus described our invention, we claim:

A device of the kind described comprising a container, a longitudinal element polygonal in cross section and mounted for rotary movement in the container, a beater frame united with the element, a second beater frame between which and the first said beater frame and element there is relative passing movement, and means for rotating the element and its attendant beater frame, both beater frames having longitudinal rails polygonal in cross section and paralleling the element and so disposed in their frame as to function their corners as cutting edges, the rails of the second said beater frame passing between the element and the rails of the first said beater frame, so that a substance being mashed will be cut by the rails of both frames and crushed between the corners of the element and the rails of the second beater frame.

In testimony whereof we affix our signatures.

ROSS C. COX.
JOHN F. McGINNITEY.